United States Patent [19]

Woodley

[11] Patent Number: 4,635,869
[45] Date of Patent: Jan. 13, 1987

[54] APPARATUS AND METHOD FOR INITIATING A TAPE WINDING OPERATION

[75] Inventor: George M. Woodley, Shrewsbury, Mass.

[73] Assignee: King Instrument Corporation, Westboro, Mass.

[21] Appl. No.: 787,780

[22] Filed: Oct. 15, 1985

[51] Int. Cl.⁴ .................... B65H 75/28; G03B 1/04; G11B 15/32
[52] U.S. Cl. .................... 242/67.1 R; 242/74; 242/195
[58] Field of Search ............. 242/56 R, 56 A, 67.1 R, 242/74, 195

[56] References Cited

U.S. PATENT DOCUMENTS

| | | | |
|---|---|---|---|
| 2,050,794 | 8/1936 | Humphner | 242/56.6 X |
| 2,585,227 | 2/1952 | Christman | 242/74 X |
| 3,633,839 | 1/1972 | Clark | 242/74 X |
| 3,761,035 | 9/1973 | Wang | 242/195 X |
| 3,863,863 | 2/1975 | Erde | 242/195 X |
| 3,910,526 | 10/1975 | Mosciatti | 242/195 X |
| 4,019,694 | 4/1977 | Fare et al. | 242/195 X |
| 4,519,553 | 5/1985 | Campbell et al. | 242/74 X |

OTHER PUBLICATIONS

IBM Technical Disclosure Bulletin, vol. 10, No. 2, Jul. 1967, R. C. Miller et al, 'Automatic Threading Apparatus', pp. 131–132.

Primary Examiner—Stuart S. Levy
Assistant Examiner—David Werner
Attorney, Agent, or Firm—Schiller & Pandiscio

[57] ABSTRACT

There is disclosed in the present application an apparatus and method for initiating the winding of a magnetic tape cartridge or cassette which is largely closed except for a relatively small opening which is closed at the end of the winding operation by a leader block secured to the trailing end of the tape and snapped into the opening. The present apparatus includes a vertically reciprocable finger having two sets of perforations to which a vacuum source is connected for attracting the tape temporarily and holding a leading end of the tape to be wound. The upper set of perforations is switchable between a connection with a vacuum source and one with a source of pressurized air. The leading end of the tape is first adhered to the finger by vacuum and a small quantity of water, as small as a single drop, is deposited on the leading end portion of the tape while the finger lies outside the cassette. The finger is then raised so that the leading end of the tape is brought into close proximity to a reel contained within the cassette and the upper set of perforations of the finger is then switched to air under pressure causing the wet surface of the tape to be urged against the reel and the wet tape to be entrained upon the reel to start the winding operation. Devices are also included in the present disclosure for sensing the movement of the tape and for controlling the withdrawal of the finger from within the cassette to permit the winding operation to continue.

15 Claims, 19 Drawing Figures

APPARATUS AND METHOD FOR INITIATING A TAPE WINDING OPERATION

The present invention relates generally to improvements in apparatus and methods for initiating the winding operation in machines for loading cartridges or cassettes with magnetic tape. More particularly the present invention relates to such apparatus and methods adapted for inserting the leading end of magnetic tape from a supply into the interior of a largely closed cartridge and to cause the leading end to engage a driven reel on the interior of the cartridge and to be entrained by the reel at the start of a winding operation, e.g., a cartridge of the type shown in U.S. Pat. No. 4519553.

The winding of magnetic tape reel in a cartridge which is almost totally closed except for a relatively small opening which is closed at the end of the winding operation by a leader block secured to the trailing end of the tape and snapped into the opening, presents a number of problems in reliably entraining the tape on the reel at the start of the winding operation. Other problems occur in controlling the tape at the time that the quantity of tape already loaded on the cartridge is severed from the tape source and the leading end of the tape for the next winding operation must be positively controlled to assure reliability of operation of the winding machine without requiring the continuous attention of an operator.

It is accordingly a general object of the present invention to improve the efficiency and reliability of tape winding operations.

A more particular object is to improve the overall efficiency of tape winding operations in a substantially closed cartridge.

Another object is to so improve the control of tape at the beginning and end of each tape winding operation in a tape winding machine that the need for an operator is substantially eliminated.

The foregoing objects are achieved in accordance with a feature of the present invention by an apparatus including a vertically reciprocable finger adapted to receive the leading end portion of the tape which is temporarily adhered to the finger by vacuum to be carried into the interior of the cartridge in close proximity to a reel upon which the tape is to be wound. For this purpose the finger is provided with an upper and a lower set of apertures both connectable to a vacuum source for attracting and retaining the leading end portion of the tape in contact with the finger. When the finger reaches the upper limit of its travel and the leading of the tape is in close proximity to the reel, a rotary motion is imparted to the reel and the upper set of apertures is connected to a source of pressurized air which urges the tape, previously wetted according to another feature of the invention, into contact with the reel to be thereby entrained to begin the winding operation.

An important feature of the present invention relates to the entrainment of the leading end of the tape by the reel. This is accomplished by depositing a small quantity of water, as little as a single drop, upon the tape surface to be brought into contact with the reel then being driven by a generally conventional rotary driving motor. The water on the tape is spread on the surface of the reel and thereby provides sufficient adhesion of the tape to the reel that the tape is entrained to start the winding operation.

The foregoing objects and features together with numerous advantages to be obtained from the present methods and apparatus will be more clearly understood from the following detailed description of an illustrative embodiment taken in connection with the accompanying drawings in which.

Figure 19:
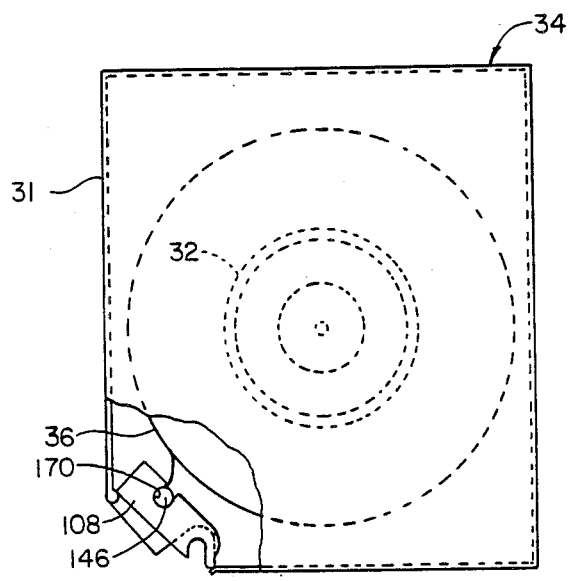
FIG. 19 illustrates one form of cartridge which is to be loaded by apparatus embodying the present invention.

FIG. 19 illustrates a loaded cartridge 34, the kind for which the present invention is designed. Cartridge 34 comprises a translucent or transparent hollow plastic housing 31 having a reel 32 on which is wound a tape 36. The outer end of tape 30 is attached to a leader block 108 that makes a snap fit in a corner opening cartridge housing 31. Such a cartridge is disclosed in U.S.A. Design Pat. No. 277851.

Figure 1:
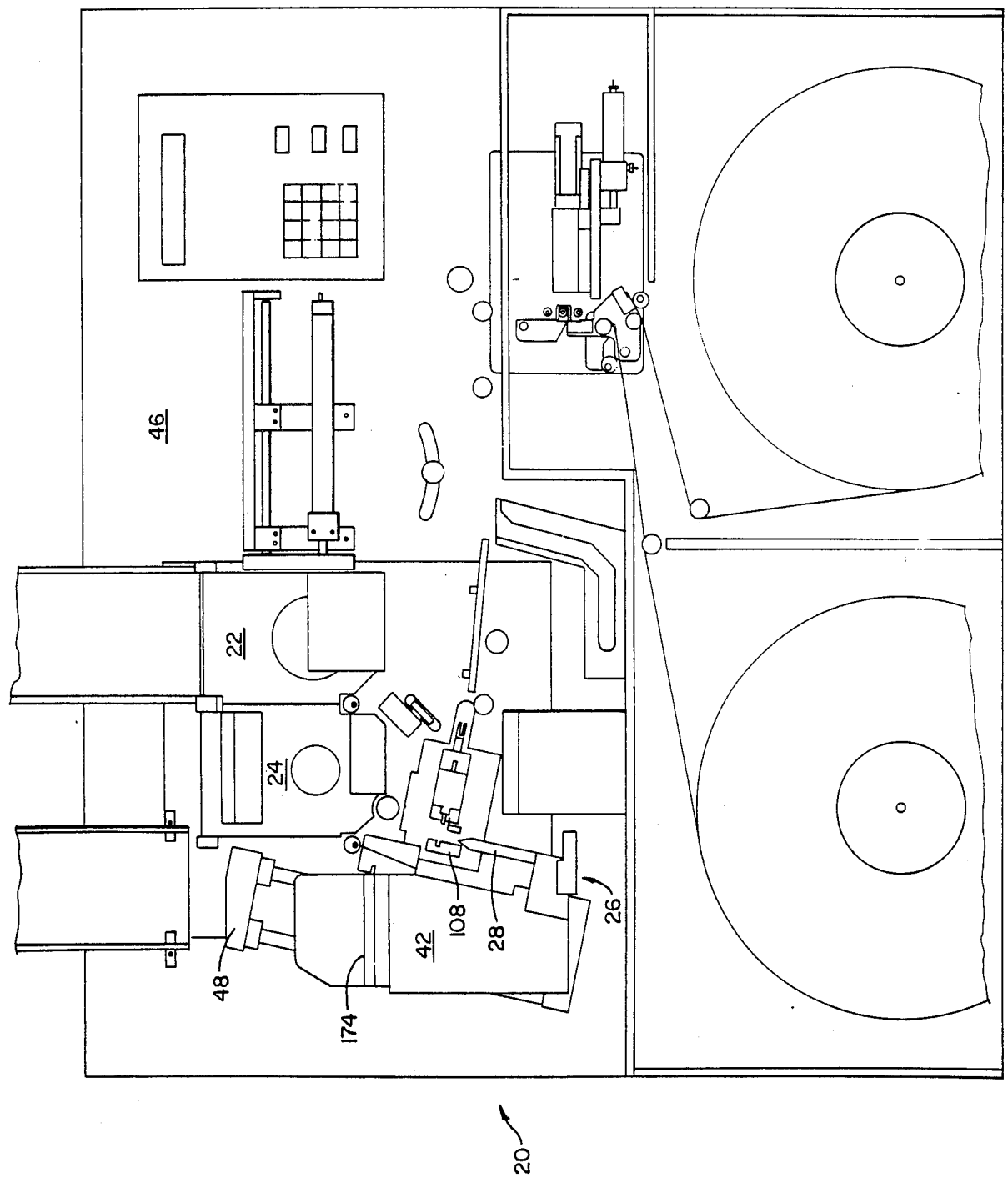
FIG. 1 is a view in front elevation of a tape winding machine including a control apparatus according to the present invention for initiating the winding operation and controlling the tape at the conclusion of the winding operation.
Figure 2:
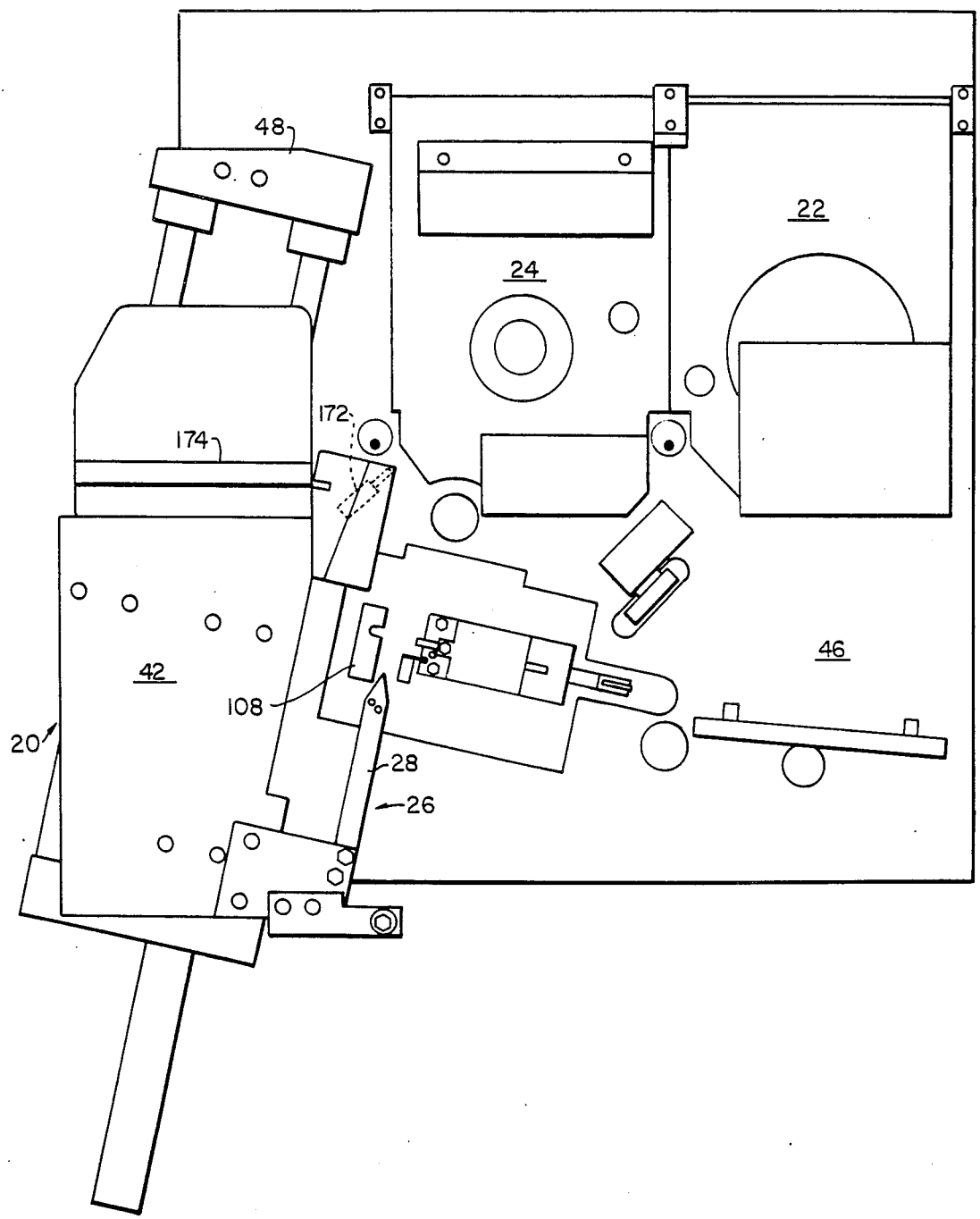
FIG. 2 is a view also in front elevation but on a larger scale of a portion of the tape winding machine of FIG. 1 in which details of the apparatus are more clearly seen.
Figure 9:
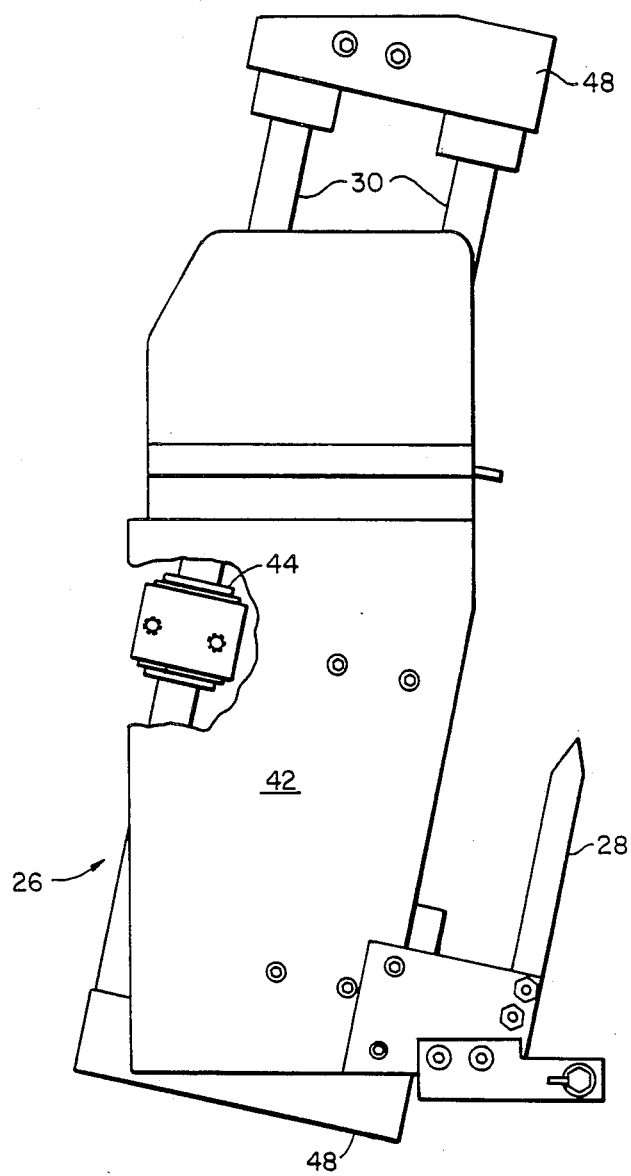
FIG. 9 is a detail view in front elevation of a tape inserting mechanism including a finger which carries the leading end of the tape into the interior of the cartridge at the start of the winding operation.
Figure 10:
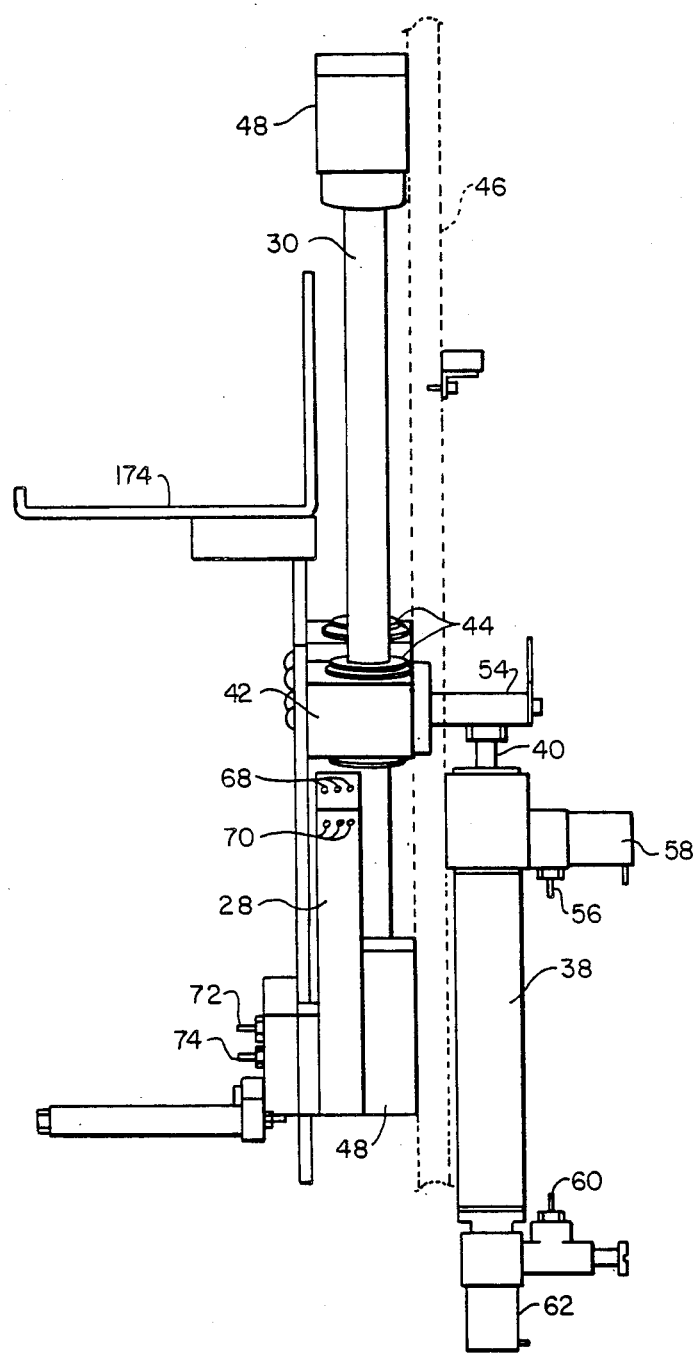
FIG. 10 is a view in right side elevation of the mechanism depicted in FIG. 9.
Figure 13:
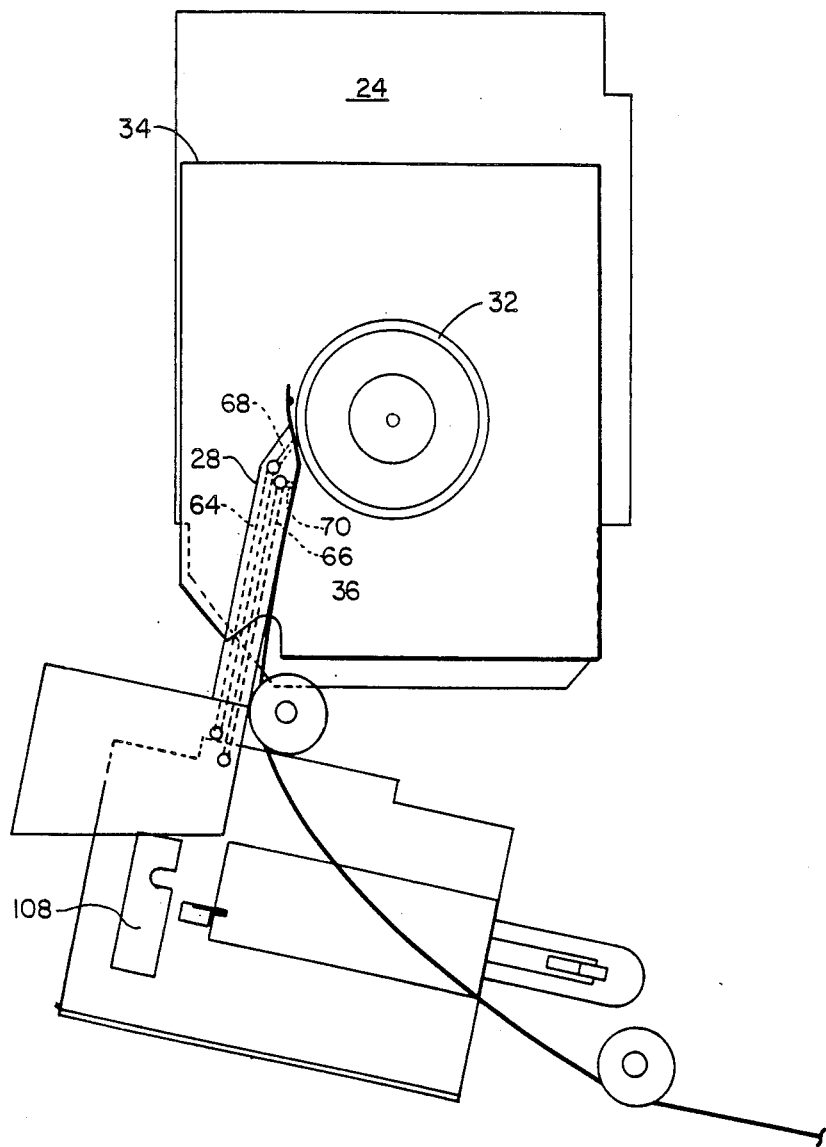
FIG. 13 is a view in front elevation and on a larger scale than FIGS. 11 and 12 but showing the tape insertion finger bringing the leading end of the tape into close proximity with the reel inside the cartridge.
Figure 14:
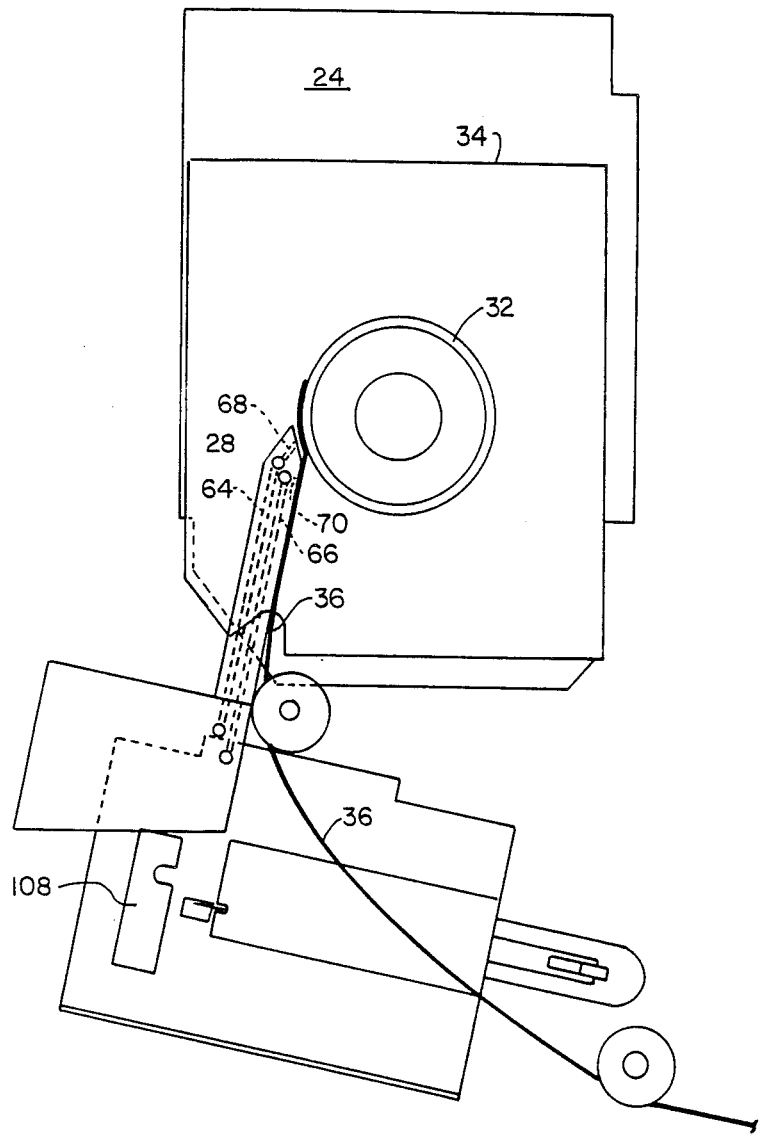
FIG. 14 is a view also in front elevation similar to FIG. 13, showing the leading end of the tape having been urged into contact with the reel at the start of the winding operation.
Figure 15:
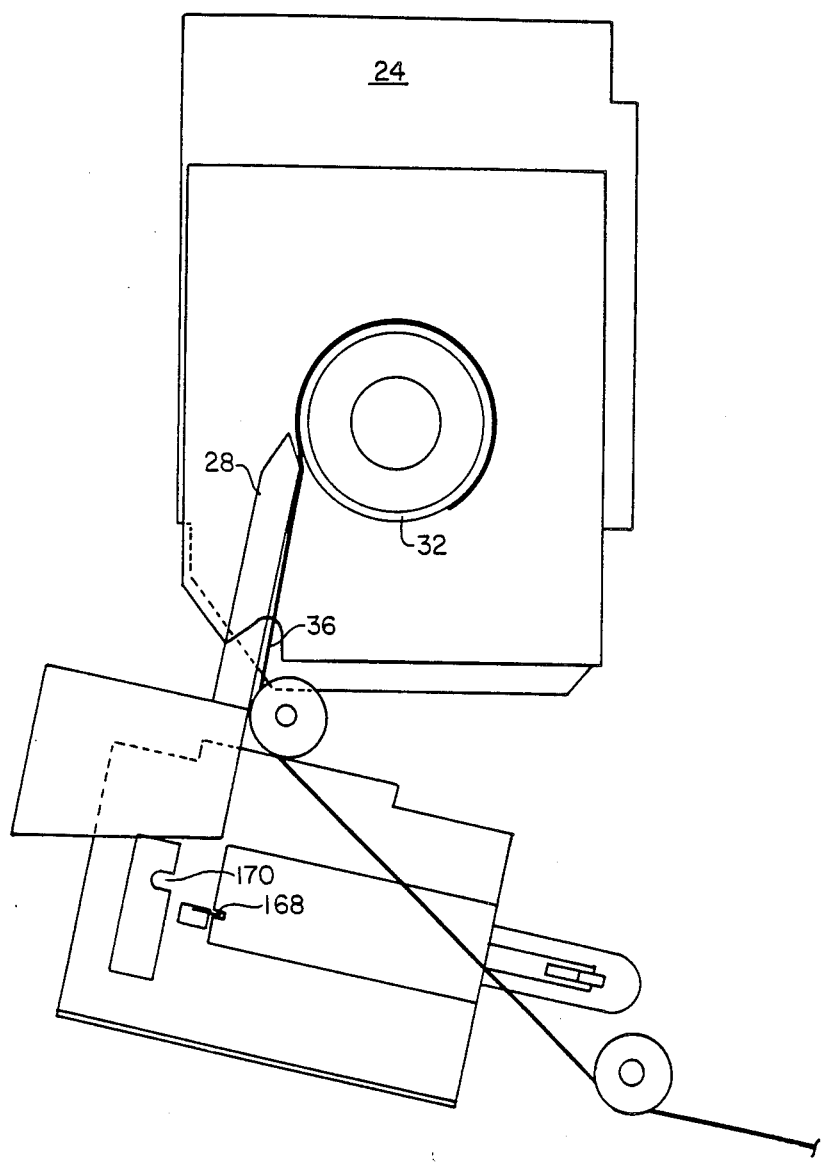
FIG. 15 is a view in front elevation similar to FIGS. 13 and 14 but showing the tape having been entrained by the reel just prior to withdrawal of the insertion finger from the interior of the cartridge.

Turning now to the drawings, particularly FIGS. 1, 9 and 10, there is shown a tape winding machine indicated generally at 20 and including a preparation or cleaning station 22 and a winding station 24. There is mounted at the winding station apparatus indicated generally at 26 for initiating the winding operation, including an inserting finger 28 best seen in FIGS. 9 and 10. The apparatus 26 includes a pair of fixed guide rods 30 upon which operating elements of the apparatus including the finger 28 are reciprocated in a generally vertical direction. Thus, the finger 28, when the mechanism is in its lowermost position is away from the winding station 24 as shown in FIG. 2, whereas the finger 28 when raised the upper extent of its travel has its top in close proximity to a reel 32 on the interior of a cartridge 34 at the winding station 24 as shown in FIG. 13. Then the tape is urged into contact with the reel as shown in FIG. 14 and finally the tape having been entrained on the reel of the finger 28 is ready for withdrawal as shown in FIG. 15. The construction and mode of operation of the finger 28 will hereinafter be described in greater detail.

There is provided for reciprocating the finger 28 an air cylinder 38 as seen in FIG. 10 whose piston rod 40 is connected to a composite movable carriage 42 fitted with bushings 44 guided for sliding motion upon the rods 30. A vertical mounting plate 46 supports a majority of the fixed elements of the machine 20 and has secured to it upper and lower yokes 48 in which the rods 30 are fixedly secured in generally parallel relationship with the plate. The cylinder 38 is fixed to the rear of the plate and its rod 40 is provided with a pivotal connection 54 extending forwardly through an appropriate slot in the plate to the carriage 42. The cylinder 38 is of the double-acting type, air being admitted to the front chamber from supply hoses connected through a nipple 56 and a solenoid valve 58 and to the rear chamber through a nipple 60 and a solenoid valve 62. Both of the valves 58 and 62 are connected to a microprocessor (not shown) which controls their timing in the operating cycle of the machine.

The finger 28 is fixedly mounted on the carriage 42 and spring urged in a clockwise direction as seen in FIGS. 13 and 14. There are provided in the finger 28 passages 64 and 66 connected respectively to upper and lower sets of apertures 68 and 70 as seen in FIGS. 10, 13 and 14. The passage 64 is connected through a hose fitted to a nipple 72 to a microprocessor controlled solenoid valve (not shown) for supplying either vacuum or air under pressure to the upper apertures 68. A similar connection is provided through a nipple 74 to the lower apertures 70 but without provision for air under pressure. Thus, while the leading end of the tape is adhered to the finger 28, when the finger 28 is in its lowermost position and during its travel to the upper limit of its movement, both pairs of apertures 68 and 70 are under vacuum. When the finger reaches its uppermost position with the leading end of the tape adjacent the reel 32, vacuum is retained at the lower apertures 70 but the apertures 68 are connected to air under pressure to blow the leading end of the tape into contact with the reel which is then being rotated. Since a drop of water has previously been deposited on the end portion of the tape (by means hereinafter described), the water is spread over the reel as a result of its contact with the reel. The wet reel, after a few turns, entrains the tape in a manner similar to that obtained by wetting one's finger in counting sheets of paper, for example.

Figure 11:
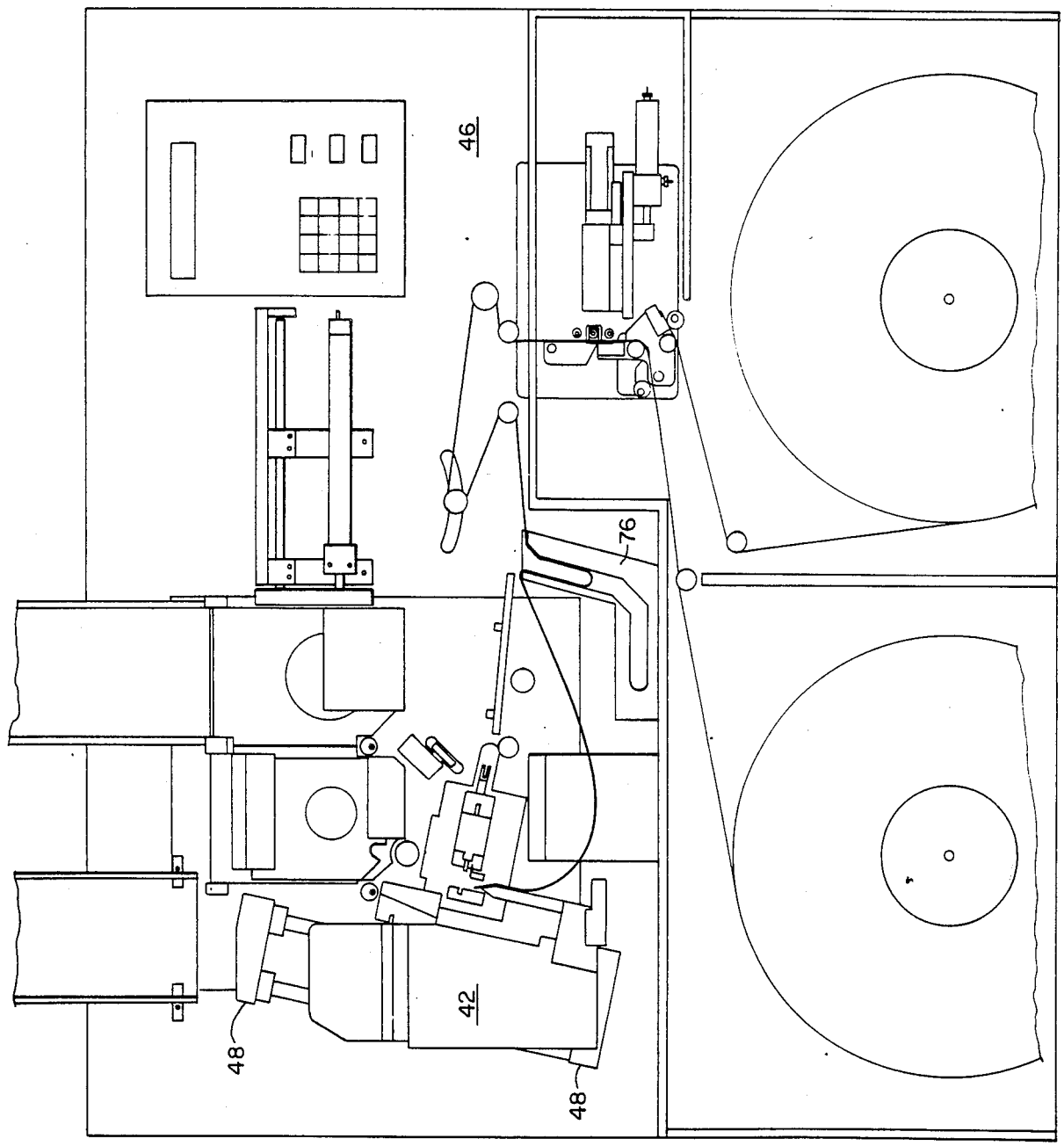
FIG. 11 is a view in front elevation of a tape winding machine shown in FIG. 1 but showing the path of the magnetic tape from one of two supply rolls to the insertion finger of FIGS. 9 and 10, the tape being shown in the position that it occupies at the start of a cartridge loading operation.
Figure 16:
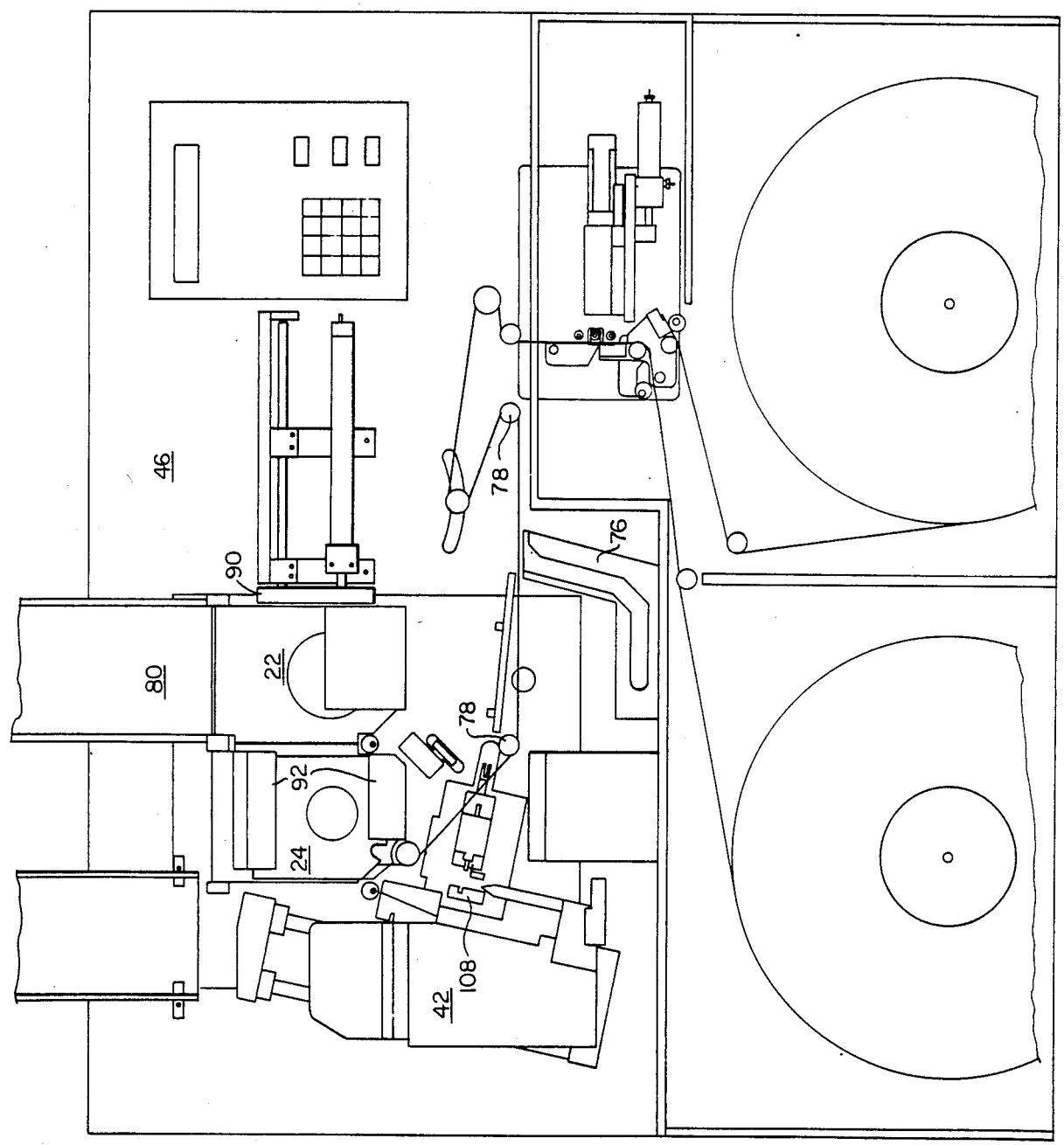
FIG. 16 is a view in front elevation similar to FIG. 12 but showing the tape winding operation in progress with the insertion finger fully retracted from the interior of the cartridge.
Figure 17:
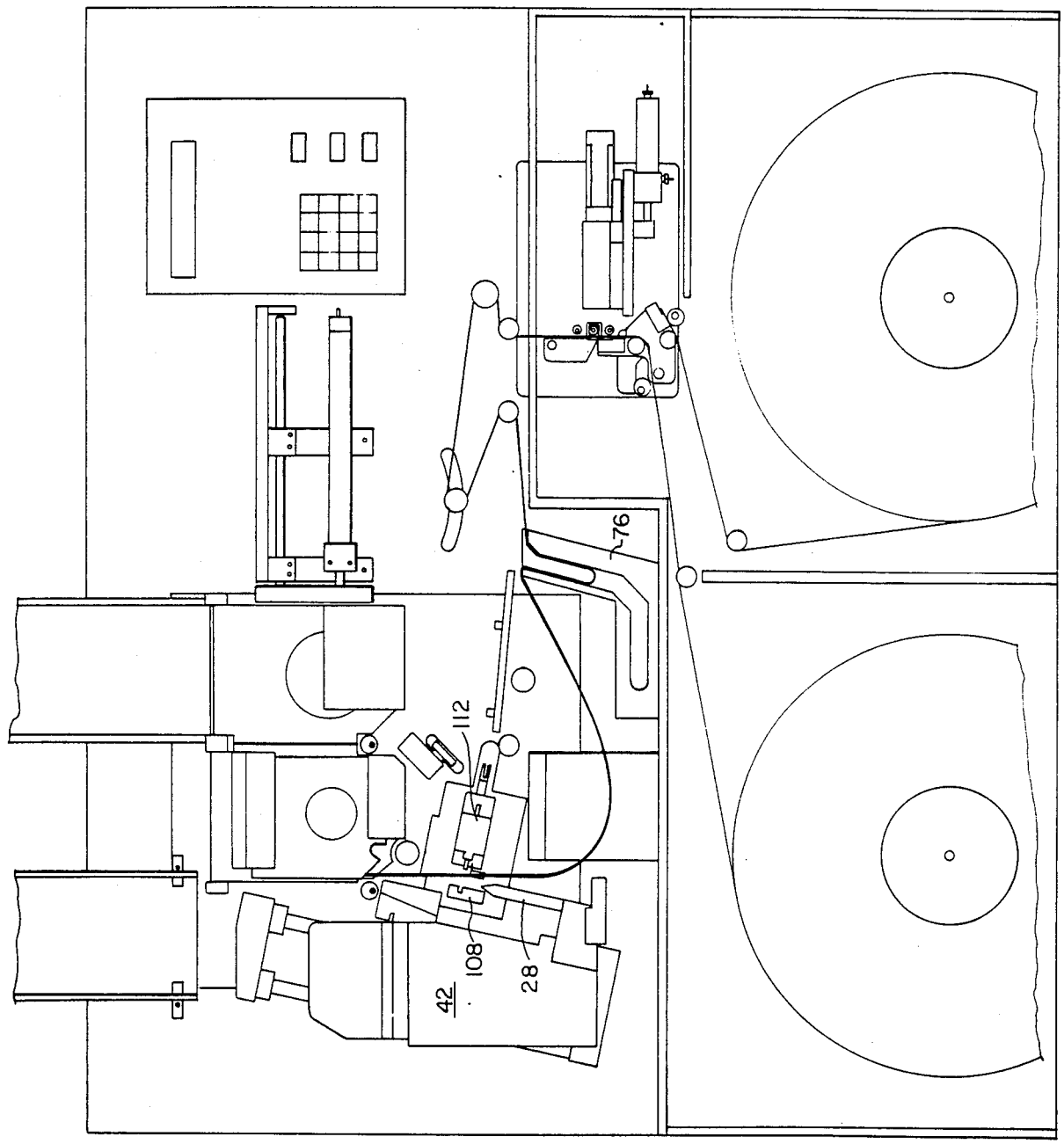
FIG. 17 is a view in front elevation similar to FIG. 12 but showing the lay of a tape at the end of the winding operation and preparatory to severing the tape in the cartridge from the supply reel.

After a very brief pre-set time, the vacuum connection to lower apertures 70 is broken, allowing the leading end of the tape to be pulled over the top of the reel and thus to provide greater surface contact between tape and reel. The entrainment of the tape is sensed by an increase in vacuum in a vacuum tunnel 76 and initiates the withdrawal of the finger from the interior of the cartridge. During the winding operation, the path of the tape as seen in FIG. 16 is outside the tunnel 76, being guided close to the upper end or mouth of the tunnel under the control of a pair of guide rolls 78. At the conclusion of the previous winding operation or at the start of the first winding operation a quantity of tape is pulled into the tunnel by vacuum from a loose adjacent section, as seen in FIG. 17. The quantity of tape necessary for a part of a turn around the reel 32, as shown in FIG. 15 is obtained from a slack loop of tape seen in FIG. 11 supplied from a previous winding operation and thereafter from the vacuum tunnel 76, which causes an increase in vacuum in the tunnel as the tape stored there is depleted. This vacuum increase is sensed (by suitable means not shown) and provides a signal to the microprocessor to open the valve 58 to open to admit pressurized air into the cylinder 38 to withdraw the finger 28 to its lowermost position.

Figure 3:
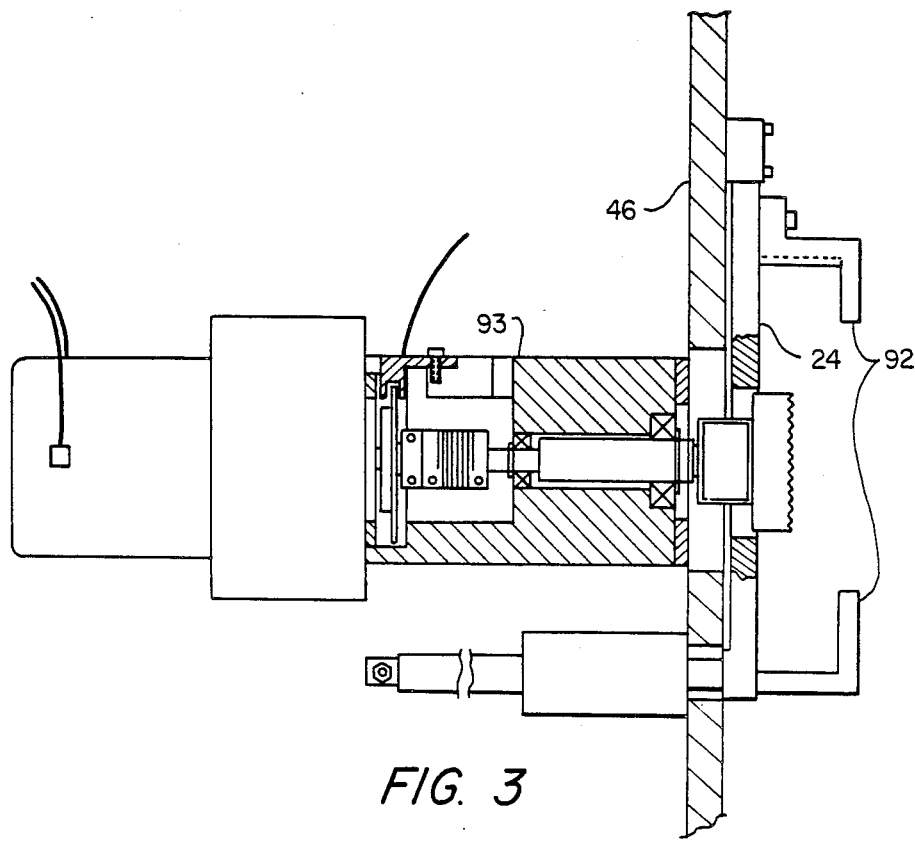
FIG. 3 is a fragmentary detailed view in vertical cross-section showing a rotary winding drive and a nesting device for positioning cartridges at a magnetic tape loading station.
Figure 4:
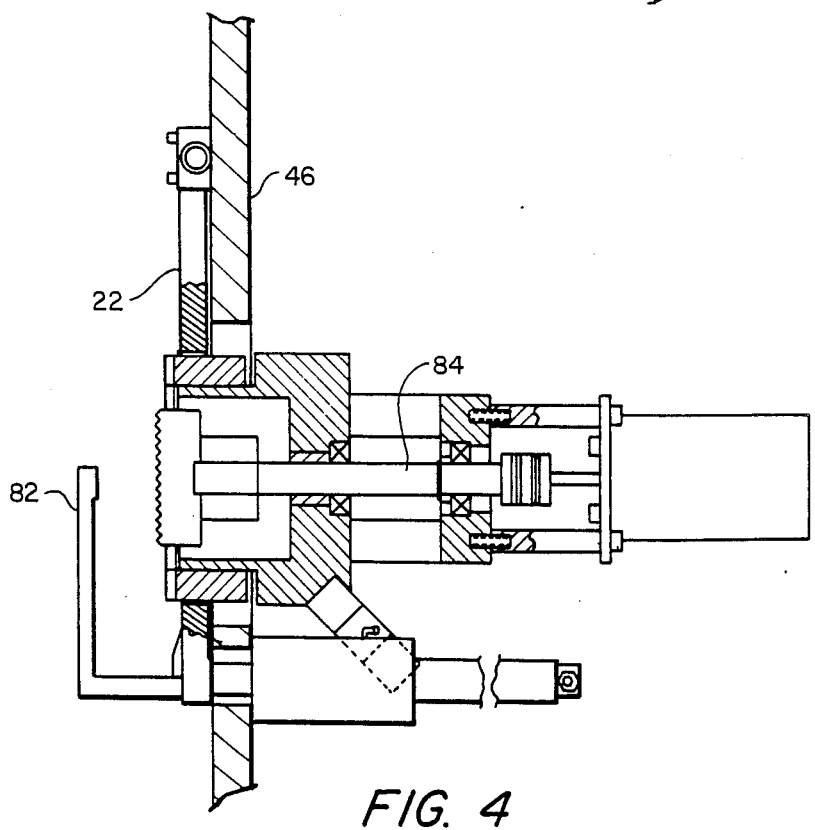
FIG. 4 is a view similar to FIG. 3 and also in vertical cross-section showing a rotary drive and a nesting device for positioning cartridges at a cleaning station in advance of the loading station.

Prior to the start of the actual winding operation, an empty cartridge is first purged of foreign matter or impurities at the cleaning station 22 before being shuttled to the winding station 24. At the cleaning station 22 empty cartridges are supplied from a chute 80 (FIG. 16) to an open-topped nest 82 where the reel is driven by a rotary drive 84 (FIG. 4) at the same time that ionized air is introduced into the cartridge and air is exhausted from the cartridge by a vacuum cleaner device. Neither the source of ionized air nor the vacuum cleaner device which exhausts the air from the cartridge as a preliminary procedure is shown since these steps are not an essential part of the present invention. After purging, the cartridge is pushed to the winding station 24 by an air-operated mechanism including an air cylinder 88 (FIG. 16) fixed to the front of the mounting plate 46, whose piston rod carries a pusher bar 90 which, when extended, shuttles the cleaned cartridge to the winding station 24. There is provided at the winding station 24 a nest 92 which positions the cartridge so that its reel is engaged and given a rotary motion by a drive 93, seen in FIG. 3.

At the loading station 24, the cartridge 34 in the nest 92 has its reel 32 supplied with tape which is brought to the reel and caused to be entrained by the action of the finger 28 as already described. Before the finger 28 enters the cartridge carrying the leading end of the tape, a drop of water is first deposited on the tape by a capillary tube 94 seen in FIG. 12.

Figure 12:
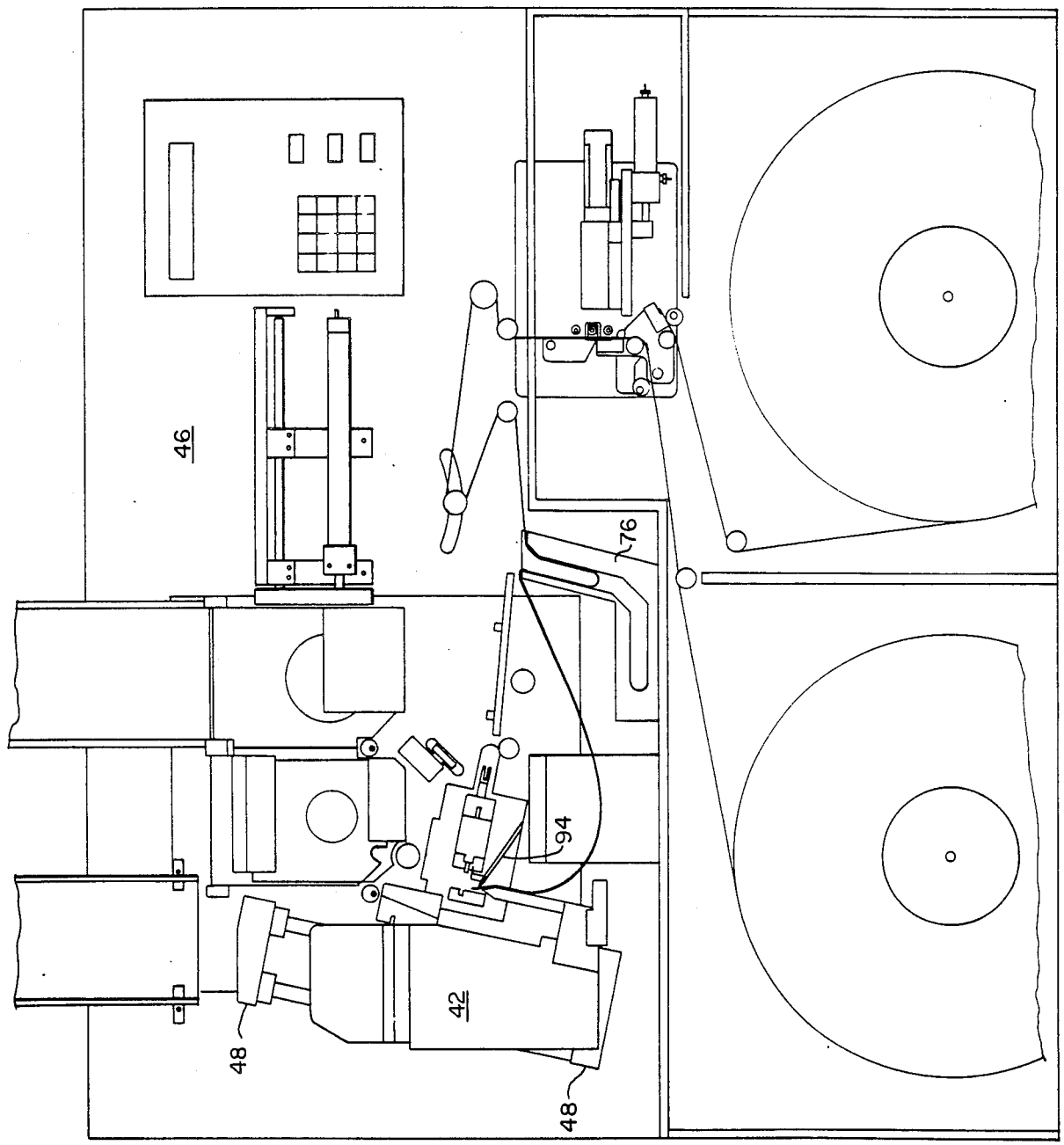
FIG. 12 is a view in front elevation similar to FIG. 11 but showing the leading end of the tape being wetted preparatory to insertion into the cartridge.
Figure 18:
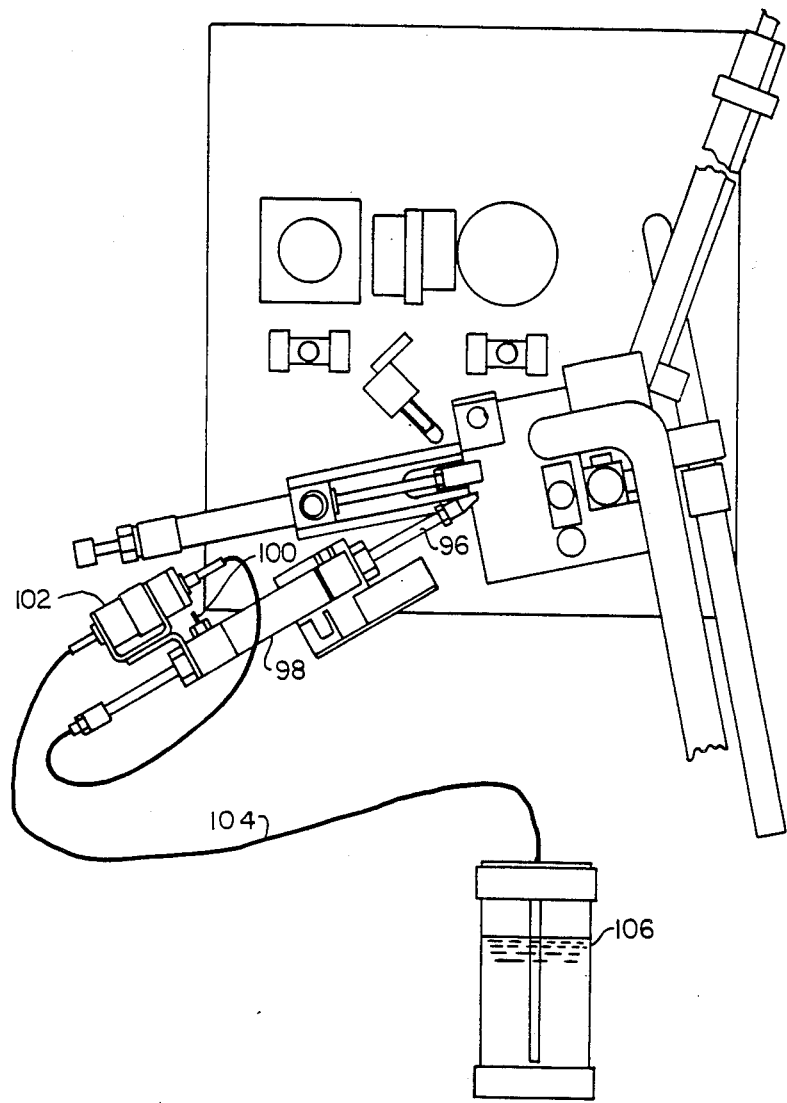
FIG. 18 is a view in rear elevation depicting various mechanisms mounted on the rear of the supporting plate of the machine.

A device for metering the water to the tube 94 and a mechanism for advancing the tube to the position depicted in FIG. 12 will now be described with reference to FIG. 18. The tube 94 is supplied with an adjustable quantity of water through a tubular piston rod 96 of an air cylinder 98 fixedly supported on the rear of the mounting plate 46. Pressurized air is introduced into the cylinder 98 through a connector 100 which is in communication with a flexible hose. Water is supplied to capillary tube 94 by a metering pump 102 connected by a flexible tube 104 to a reservoir 106. At the appropriate time in the operating cycle of the machine, pressurized air is connected to the cylinder 98 through a solenoid valve (not shown) under the control of the microprocessor which schedules the timing of the various instrumentalities of the machine. When air is introduced into the cylinder 98, the tube 94 is extended to the position depicted in FIG. 12 and pump 102 is operated to cause a drop of water to be deposited on the reel-engaging surface of the leading end portion of the tape. The rod 96 is immediately withdrawn as a supply of pressurized air to the cylinder 98 is interrupted.

Figure 5:
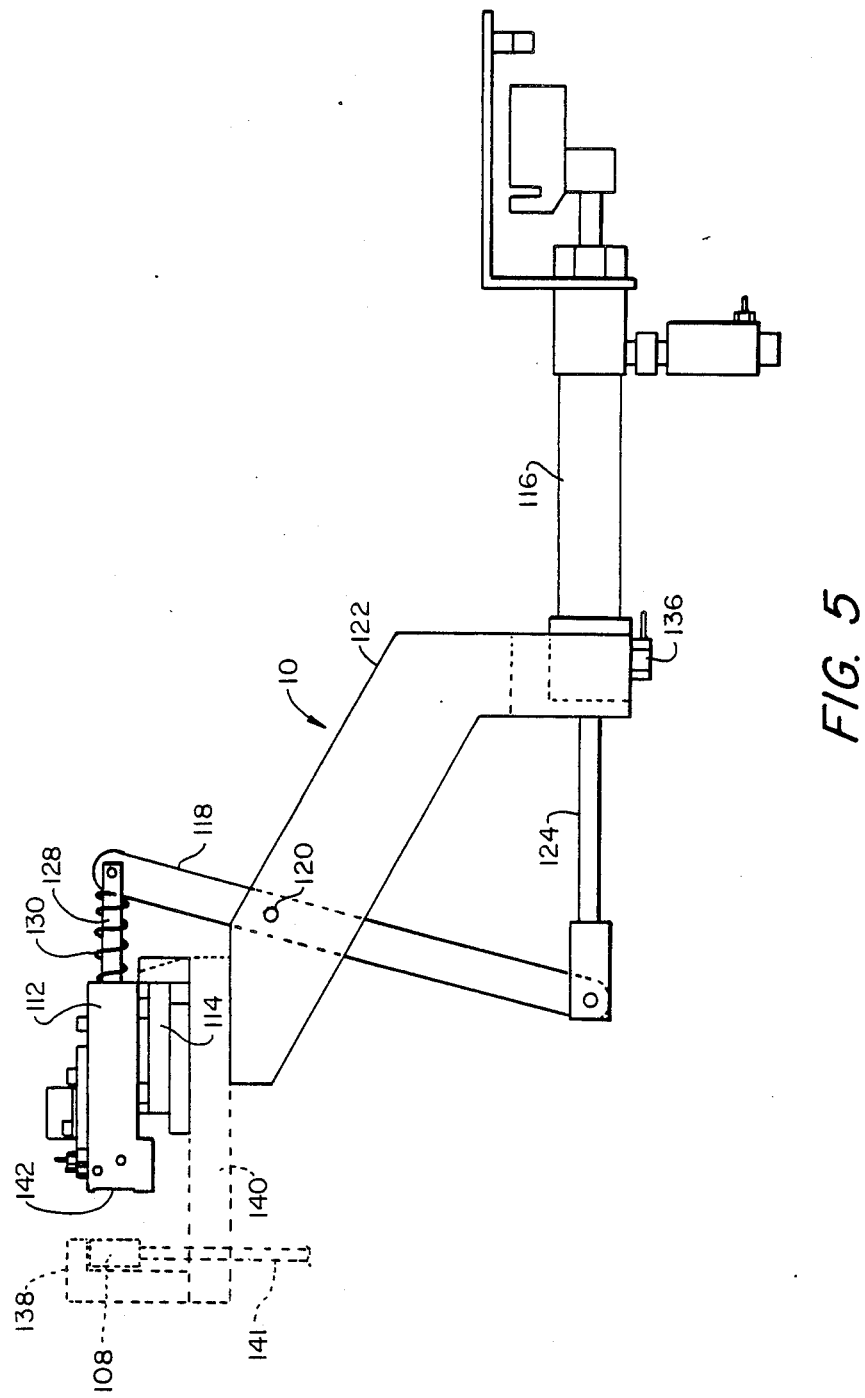
FIG. 5 is a detail view of the device as seen from the bottom of the machine, for securing the trailing end of the tape to a leader block at the end of a cartridge loading operation.
Figure 6:
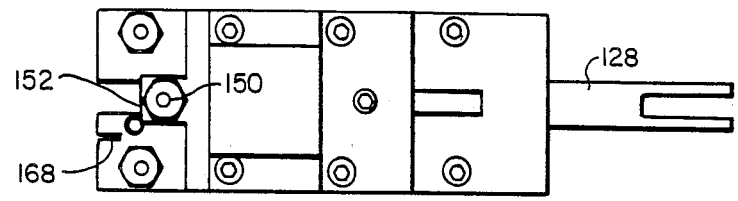
FIG. 6 is a fragmentary view in front elevation of a portion of the mechanism shown in FIG. 5.
Figure 7:
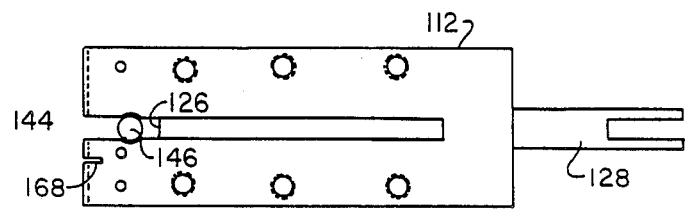
FIG. 7 is a detail view also in front elevation of the mechanism depicted in FIG. 6 but with a cover removed to disclose internal construction.

At the conclusion of the winding operation, the trailing end of the tape from the cartridge 34 is staked to a leader block 108 by a mechanism indicated generally at 110 and shown in FIGS. 5, 6 and 7. The entire mechanism 110 which is the subject of a copending application and accordingly not described here in the fullest details of its construction, is mounted on a movable platform for motion from an inactive retracted position behind the mounting plate 46 to a forward operative position in which a guide block 112 is aligned with the tape and the active surface of the finger 28. The block 112 is affixed to the top of a slide 114 for reciprocating movement from right to left and back. Motion is imparted to the block 112 on the slide 114 by an air cylinder 116 and a lever 118 pivoted at 120 on a bracket 122. The cylinder 116 is provided with a piston rod 124 to which one end of the lever 118 is connected, the other end of the lever being pivotally connected to a plunger 126 which actuates a staking punch 128 slidable in the block 112. The motion of the rod 124 is transmitted both to the block 112 and to the punch 128 because of the presence around the plunger 126 of a compression spring 130 which first causes the block 112 to move to the leftward limit of its travel and thereafter imparts motion to the punch 126.

As the piston rod 124 is retracted by compressed air being introduced into the foward chamber of the cylinder 116 through a connector 136, the block 112 is first urged to the left as seen in FIG. 5. This motion of the block 112 occurs after a leader block 108 has been received in a nest 138 fixed to a plate 140. While the mounting block 112 is still behind the mounting plate 46, the leader block 108 is received from a magazine in the form of a chute (not shown) and is urged forwardly into the nest 138 by a rod 141 which is actuated by an air cylinder, not shown, but more particularly described in my co-pending application. The rod 141 not only conveys the leader block 108 through a horizontal passage and seats it in the nest 138 but then also retains the leader block firmly in the nest as the mechanism is advanced to its foward position in which an active leftward surface of the block 112 is in close proximity but slightly above the operative surface of the finger 28.

The surface 142 is formed with a shallow channel, the bottom wall of which is connected to a vacuum source to assist the finger 28 in controlling the tape and by detecting air leakage through the apertures senses the absence of tape against the bottom surface of the channel. As best seen in FIG. 7, the block 112 is formed with an interior enlargement 144 in which a short length of staking rod 146 is retained after having been received from a magazine indicated generally at 148 in FIG. 8. A vacuum connector 150 shown in FIG. 6, by sensing leakage of air through the surface of a cover 152 overlying the enlargement 144 ascertains that no rod 146 is present in the enlargement and interrupts the operation of the machine in the event that no rod is present. The rod length 146 is advanced from the magazine 148 to the enlargement 144 by a plunger 154 driven by an air cylinder 156 through the horizontal delivery tube 158 fixedly supported on a stationary auxiliary plate 160. The leftward end portion of the delivery tube 158 is maintained in the condition of being filled with staking rod lengths 146 from the magazine 148 so that the plunger 154 is effective to load a rod length into the enlargement 144 by advancing the most recently admitted rod length and thereby pressing the most advanced rod length into the enlargement.

Figure 8:
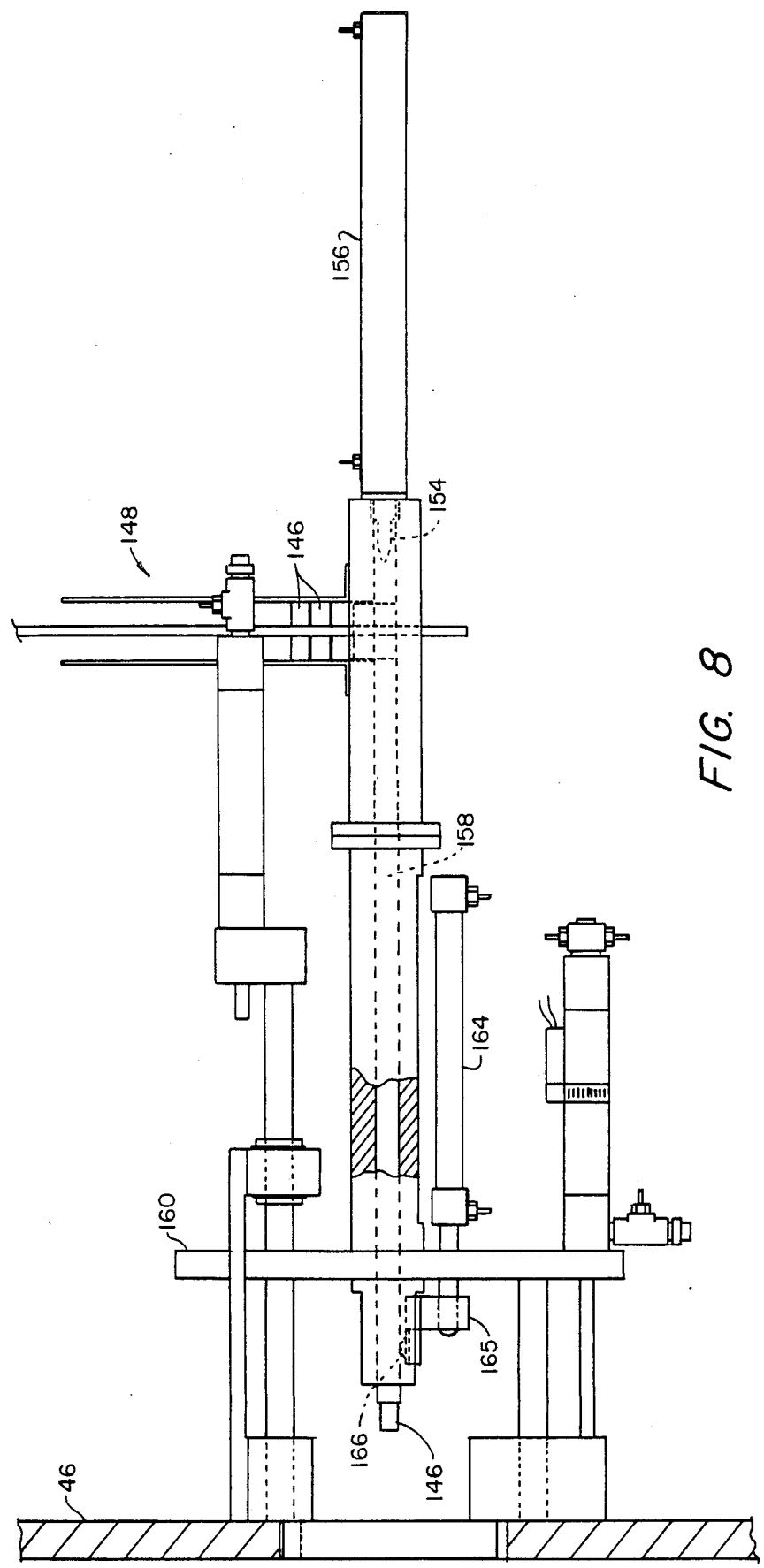
FIG. 8 is a plan view depicting mechanisms mounted on the rearward side of a support plate and including a knife for severing the tape at the end of a winding operation and a feeder for furnishing a short length of rod to the mechanism of FIGS. 5–7.

After a measured length of tape has been loaded into the cartridge the winding motor 93 is stopped, and staking mechanism 110 is advanced to its forward position, trapping the tape between the leader block 108 and the surface 142. The winding motor 93 is then briefly energized to seat the tape and the shallow groove in the surface 142 where the tape, is retained by vacuum and its presence sensed as already described. The winding motor is then reversed briefly to provide a small quantity of slack tape to permit the staking operation to continue. The block 112 is then moved to the right away from the leader block 108 carrying the tape. At this point in the cycle of the machine, an air cylinder 164 seen in FIG. 8 is energized to thrust forward a holder 165 carrying a knife blade 166 which severs the tape by passing through a slot 168 in the left surface 142. As it is being severed and immediately thereafter the tape is retained by vacuum at two different areas of the surface 142 above and below the slot 168. The knife 166 is withdrawn as soon as the tape is severed and the cylinder 116 is energized to extend the rod 124 causing the block 112 to move to the left first pinching the tape between the surface 142 and the leader block and as a result of the continuing extension of the rod 124, to insert the length of staking rod 146 into a cavity 170 in the surface of the leader block. The rod 146 which has been carried from the enlargement 144 by the punch 126 is inserted into the cavity, the rod and cavity being so sized that the trailing end of the tape between the rod and the wall of the cavity 170 is securely retained by friction. The movement of the block 112 to the left in addition to accomplishing the staking function brings into contact with the operating surface of the finger 28 the leading end portion of tape from the supply reel. In that position shown in FIGS. 11 and 12, the tape is ready for the beginning of the next winding or cycle.

After severing of the tape, staking of the trailing end from the loaded cartridge, vacuum is turned off to the block 112 and the winding motor 93 is energized to wind the tape carrying the leading block 108 to the opening of the cartridge where a light stroke from a piston rod of a small cylinder 172 shown in FIG. 2 inserts and seats the leader block into the opening in the cartridge. A final step in the winding operation and the preparation for the processing of the next cartridge is the removal of the loaded cartridge from the winding station. This is accomplished as the purged empty cartridge from the cleaning station 22 is shuttled to the winding station 24, thereby pushing the loaded cartridge onto a shelf 174 as seen in FIGS. 2 and 13, from which the loaded cartridge is carried by suitable conveyor means.

From the foregoing description and illustrative embodiment of our invention, many variations within its scope will immediately become obvious to those of ordinary skill in the tape winding machine art. For example, the finger 28 and its operation in starting the alignment of tape may be useful in many other different environments without all of the accompanying devices as disclosed in this application. It is accordingly not intended that this specification be taken in a limiting sense but rather that the scope of the invention be measured in terms of the appended claims.

Having thus disclosed my invention, what I claim is new and desire to secure a letters patent of the United States is:

1. An apparatus for initiating a tape winding operation upon a reel that forms part of a tape cartridge, said apparatus comprising:
   a tape presentation means for holding the leading end of a tape having a reel-engaging surface, said tape presentation means comprising a tape supporting surface;
   means for moving said tape presentation means from a first selected tape-holding position in which said tape supporting-surface is spaced from said reel and a second selected tape-presenting position in which said tape-supporting surface is adjacent said reel;
   said tape presentation means having at least one first aperture and at least one second aperture in said tape-supporting surface, with said at least one first aperture being located close to one end of said tape-supporting surface and said at least one second aperture being spaced from said at least one first aperture;
   first means for connecting said at least one first aperture to a source of vacuum when said tape presentation means is in said first position and to a source of pressurized air when said tape presentation means is in said second position, said at least one first aperture being located so that a stream of air exiting said at least one first aperture will urge the end of a tape engaged with said tape-supporting surface into contact with said reel; and
   second means for (a) connecting said at least one second aperture to a source of vacuum when said presentation means is in said first position or said second position, and (b) disconnecting said at least one second aperture from said source of vacuum after the leading end of said tape has been urged into contact with said reel by a stream of pressurized air exiting said at least one first aperture.

2. Apparatus according to claim 1 further comprising tape-wetting means for wetting the reel-engaging surface of the leading end of said tape prior to its presentation to said reel, said tape-wetting means comprising a capillary tube, and means for moving said capillary tube between a first retracted position in which the exit end of said tube is spaced from said tape-supporting surface and a second extended position in which the exit end of said tube is in proximity with said tape-supporting surface.

3. Apparatus according to claim 2 wherein said capillary tube is in its first retracted position when said tape presentation means is in its second tape-presenting position, and said capillary tube is moved to its second extended position only when said tape presentation means is in its first tape-holding position.

4. Apparatus according to claim 1 wherein said tape-supporting surface comprises first and second surface portions located in angular relation to one another, and further wherein said at least one first aperture is in said first surface portion and said at least one second aperture is in said second surface portion.

5. Apparatus according to claim 1 wherein said tape presentation means comprises an elongated finger with said tape-supporting surface constituting a surface of said finger.

6. Apparatus according to claim 5 wherein said tape-supporting surface comprises first and second surface portions located in angular relation to one another with said first portion being located at the end of said finger, and further wherein said at least one first aperture is in said first surface portion and said at least one second aperture is in said second surface portion.

7. Apparatus according to claim 5 wherein said means for moving said tape presentation means is adapted to move said finger along a straight line path between said first selected tape-holding position and said second tape presentation position, said straight line path extending generally parallel to the longitudinal axis of said finger.

8. An apparatus for initiating a tape winding operation upon a reel that forms part of a tape cartridge that is to be loaded with tape, said apparatus comprising:
   means for holding said tape cartridge in a selected tape-loading position;
   means for driving said reel so as to wind on said reel a selected length of a tape that is engaged with said reel;
   a tape presentation means for holding the leading end of a tape having a reel-engaging surface, said tape presentation means comprising an elongated member having a tape-supporting surface for supporting the leading end of a tape, a carriage supporting said elongated member, and means for reciprocating said carriage so as to move said elongated member from a first selected tape-holding position in which said tape-supporting surface is spaced from said reel and a second selected tape-presenting position in which said tape-supporting surface is adjacent said reel;
   said elongated member having at least one first aperture and at least one second aperture in said tape-supporting surface, with said at least one first aperture being located at the distal end of said elongated member and said at least one second aperture being spaced from said at least one first aperture;
   first means for connecting said at least one first aperture (1) to a source of vacuum when said elongated member is in said first tape-holding position so as to hold a first end portion of a leading end of a tape against said tape-supporting surface by suction, and (2) to a source of pressurized air when said elongated member is in said second tape-presenting position, said at least one first aperture being located so that a stream of air exiting said at least one first aperture will urge said first end portion of the leading end of a tape engaged with said tape-supporting surface into contact with said reel; and second means for (1) connecting said at least one second aperture to a source of vacuum when said presentation means is in said first position or said second position so as to hold a second portion of the leading end of a tape by suction against said tape-supporting surface, and (b) disconnecting said at least one second aperture from said source of vacuum after the first end portion of the leading end of said tape has been urged into contact with said reel by a stream of pressurized air exiting said at least one first aperture, whereby to fully release said tape from said tape-supporting surface.

9. Apparatus according to claim 8 further comprising means for imparting rotary motion to said reel when said first end portion of the leading end of said tape is urged into contact with said reel.

10. An apparatus for initiating a tape winding operation upon a reel enclosed within and forming a part of a largely closed cartridge having a limited access opening in an exterior wall, said apparatus comprising:

means for releasably holding said cartridge in a selected loading position;

means for rotating the reel of said cartridge when said cartridge is in said selected loading position;

tape presentation means for releasably holding the leading end of a tape having a reel-engaging surface and presenting said reel-engaging surface to a cartridge disposed in said selected loading position, said tape presentation means including a finger dimensioned to enter through said opening, means for moving said tape presentation means between a first position in which said finger is spaced from said cartridge and a second position in which said finger extends into said opening into close proximity with said reel, said finger having a tape-supporting surface and first and second apertures in said tape-supporting surface, means for selectively connecting said first aperture to (a) a source of vacuum when said tape presentation means is in said first position and (b) a source of pressurized air when said tape presentation means is in said second position, and means for selectively (a) connecting said second aperture to a source of vacuum when said tape presentation means is in said first or second positions and (b) disconnecting said second aperture means from said source of vacuum after said tape presentation means has moved into said second position and said pressurized air has caused a portion of said tape to engage said reel; and means for selectively wetting said reel-engaging surface of a tape held in said tape-supporting surface when said tape presentation means is in said first position.

11. A method of entraining a tape from a supply onto a reel of a cartridge disposed in a selected tape-loading position, said method comprising the steps of:

retaining the leading end of said tape against a tape presentation means by vacuum so that a first surface of said tape is exposed;

depositing a drop of water upon said first surface at the distal portion of the leading end of said tape;

moving said tape presentation means so as to bring the distal portion of said leading end into close proximity to the reel;

maintaining a second portion of said leading end against said tape presentation means by suction while directing a stream of air under pressure against said distal portion so as to urge the wet first surface of said distal portion into adhering contact with said reel;

imparting a rotary motion to the reel so as to cause said tape to be wound onto said reel; and releasing the suction on said second portion of the leading end of said tape so as to free said tape for rapid winding on said reel.

12. A method of entraining a tape from a supply onto a reel mounted on the interior of a substantially closed cartridge having a limited access opening in an exterior wall, said method comprising the steps of:

using suction to temporarily retain the leading end of the tape on an instrument sized to pass through the opening and carry the leading end of the tape into close proximity with the reel;

wetting an exposed surface of the leading end of said leading tape end;

moving said instrument into said cartridge via said opening so as to bring said leading end portion of said tape to a position adjacent said reel;

imparting a rotary motion to said reel;

using a stream of pressurized air to urge the distal portion of the leading end of said tape into contact with said rotating reel so as to cause the wet surface of said tape to adhere to said reel, and simultaneously using suction to maintain another portion of said leading end on said instrument;

terminating said suction so as to release said another portion of said leading end from said instrument when said distal end portion has begun to be wound onto said reel; and withdrawing said instrument from said cartridge.

13. A method according to claim 12 wherein the wet distal portion of the leading end of said tape is urged away from said instrument and into contact with said reel by pressurized air directed at said tape through at least one aperture in said instrument.

14. A method according to claim 12 wherein said instrument has at least one first aperture and at least one second aperture, and further wherein (1) suction is applied to said tape through said at least one first aperture and said at least one second aperture so as to retain said tape against said instrument while said instrument is outside of said cartridge, (2) after said instrument has been positioned within said cartridge, suction is maintained on said tape via said at least one second aperture but a stream of pressurized air is applied to said tape through said at least one first aperture so as to urge said distal portion of said leading end away from said instrument against said reel, (3) the application of suction to said tape through said at least one second aperture is terminated after rotary motion is imparted to said reel and said leading end has begun to be wound onto said reel, and (4) after the instrument has been withdrawn from the cartridge, rotary motion of the reel is stopped and suction is reapplied through said at least one first and second apertures so as to again cause said tape to be retained against said instrument.

15. A method according to claim 14 wherein said instrument has a first tape-supporting surface at one end thereof and a second tape-supporting surface disposed adjacent and at an angle to said first tape-supporting surface, and said at least one first aperture is located in said first surface and said at least one second aperture is located in said second surface.

* * * * *